May 26, 1953 A. G. McKEE 2,639,551
GREENHOUSE WITH MEANS FOR CONTROLLING LIGHT AND HEAT
Filed June 1, 1949 2 Sheets-Sheet 2
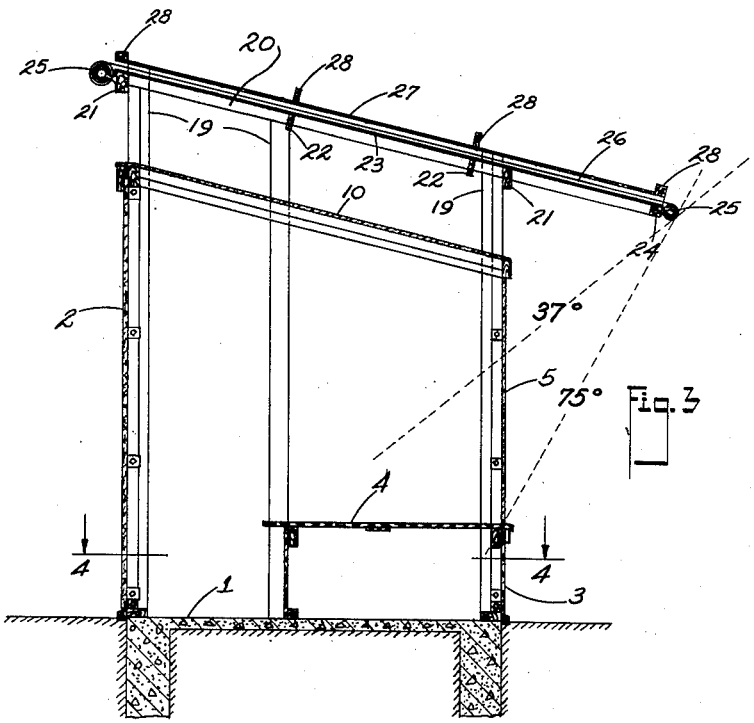
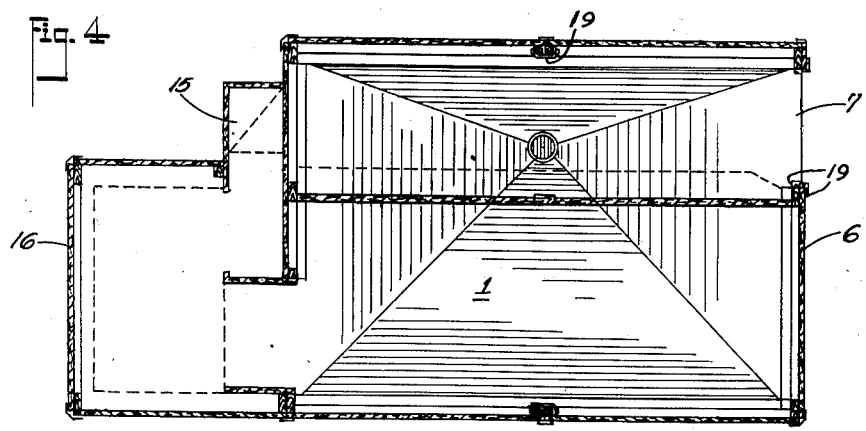
INVENTOR.
ARTHUR G. McKEE
BY
Richey & Watts
ATTORNEYS Patented May 26, 1953

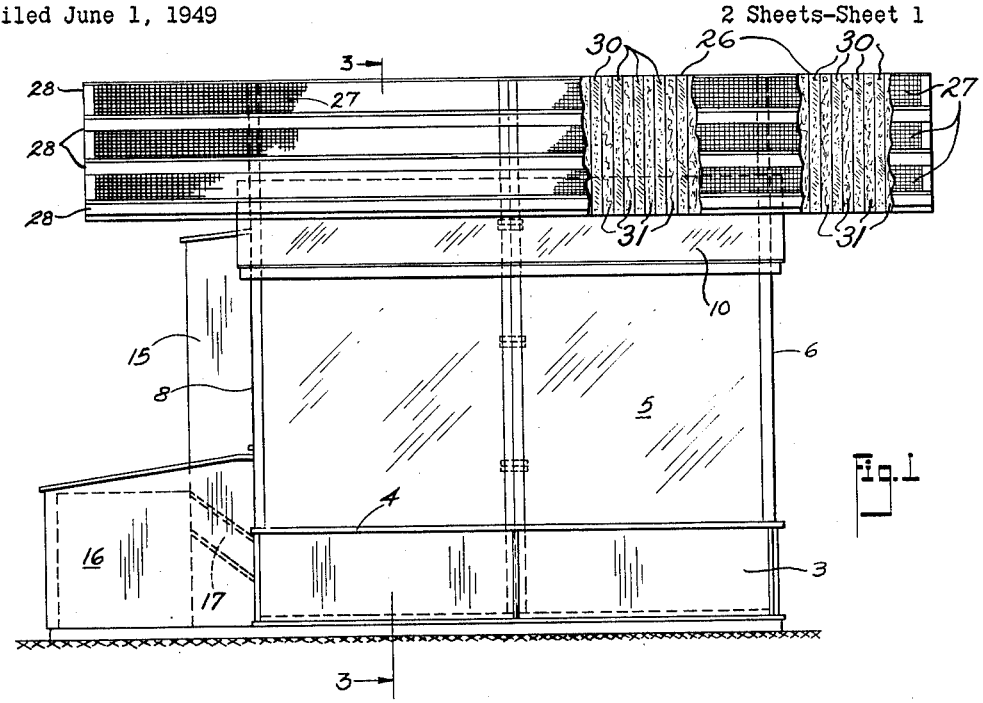
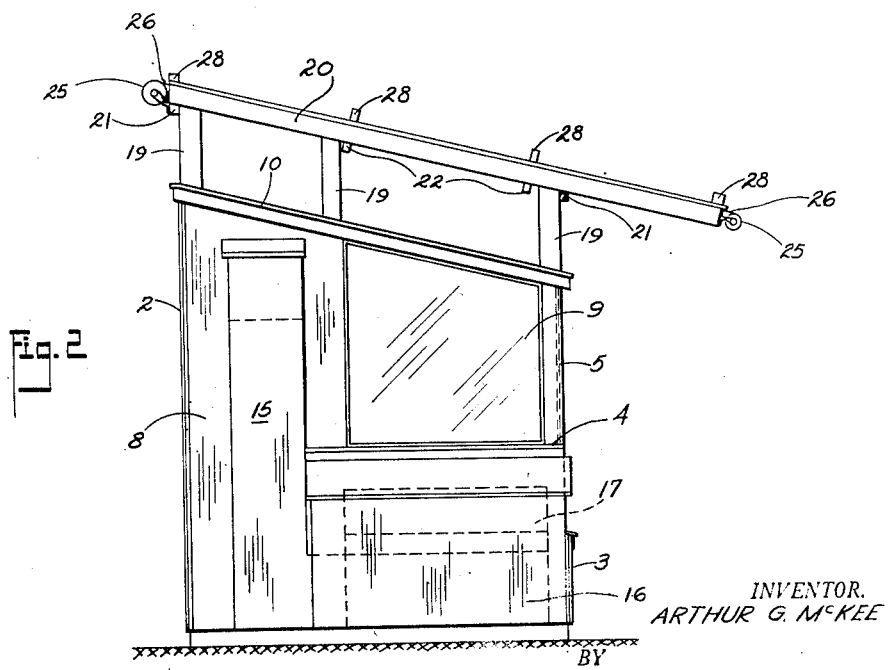

2,639,551

UNITED STATES PATENT OFFICE 2,639,551

GREENHOUSE WITH MEANS FOR CONTROLLING LIGHT AND HEAT

Arthur G. McKee, Cleveland, Ohio

Application June 1, 1949, Serial No. 96,490

10 Claims. (Cl. 47—17)

This invention relates generally to greenhouses and particularly to an air conditioned greenhouse having an air flow inducing roof structure, to a new curtain for greenhouses, and to a new means for controlling light admitted to plants in a greenhouse.

In my copending application, Serial No. 775,200, filed September 20, 1947, I have shown a greenhouse which includes, as an important feature thereof, a flexible, translucent, retractible curtain which can be rolled and unrolled at different times of the day to regulate the amount of direct sunlight which can reach the plants within the greenhouse. That greenhouse is also provided with means for creating circulation of air therethrough and thereby controlling to some extent the temperature of the atmosphere within the greenhouse. I have found that, under certain conditions, it is necessary to maintain a greenhouse at a lower temperature and to exercise a greater control over the amount of sunlight which is allowed to strike the plants than could be achieved by the greenhouse of that application. The present invention makes it possible to attain these objectives by providing new elements and a new combination of elements.

The invention will be better understood by those skilled in the art from a consideration of the drawings which accompany and form a part of this specification and in which, Fig. 1 is a south side elevational view of a preferred form of greenhouse embodying my invention;

Fig. 2 is a west end elevational view of the greenhouse of Fig. 1;

Fig. 3 is a vertical sectional view taken on line 3—3 of Fig. 1; and

Fig. 4 is a horizontal sectional view taken on line 4—4 of Fig. 3.

The greenhouse of Figs. 1 to 4 comprises a floor 1, a north wall 2 preferably composed of some stiff material, such as insulating wall board, for example, a south wall consisting of a lower portion 3 which extends from floor 1 up to the plant-supporting table 4 and is composed of some suitable material, such as that making up north wall 2, and an upper portion 5 extending upwardly from table 4 and preferably composed of wind-resisting translucent material such as plastic material, ordinary glass or fiber glass.

The east end wall 6 is provided with a doorway 7 and a door (not shown) to give access to the space to the north of the plant-supporting table 4, and the remainder of the wall 6 may be made of the same material as part 5 of the south wall or of the material of north wall 2 depending on whether or not it is the desire to admit sunlight through this end wall to plants on the table 4. The west end wall comprises a panel 8 preferably consisting of material such as that constituting north wall 2, and a translucent portion 9 above and at the end of table 4 and composed of material such as that constituting portion 5 of the south wall.

The columns of the north wall 2 extend some distance higher than the top of the south wall and a main roof 10 is inclined upwardly from the top of the south wall to the top of the north wall and extends from one end wall to the other end wall. This main roof 10 preferably consists of wind-resisting, flexible, translucent material such, for example, as fiber glass or plastic material. The floor, the north and south walls, the end walls and the roof define a chamber which may be referred to as the plant-growing space.

An air duct 15 extends downwardly along the outside of the west end wall or at any other desirable point or points and at its upper end has an inlet opening from the plant-growing space near roof 10. At its lower end the air duct has an outlet opening into an air cooling or conditioning chamber 16 which communicates through a downwardly extending passage 17 with the space beneath table 4. Any suitable air cooling or conditioning apparatus may be located in chamber 16 to treat the air passing through the chamber.

The studding 19 of the side and end walls of the structure project upwardly beyond main roof 10 and at their upper ends carry rafters 20 and purlins 21 and 22. The rafters project some distance beyond the south wall 5 for a purpose presently to appear. These parts constitute a skeleton roof structure. Wire screen 23 is attached to the upper surfaces of these rafters and purlins and also to a plate 24 which is attached to the projecting ends of the rafters. Hangers 25 are attached to the upper purlin 21 and to the lower plate 24 and serve to support removable rollers on which is wound a translucent, flexible, protractile curtain 26. The curtain may be adjusted, as by turning the rollers so as to uncover more or less of the main roof 10 and thereby to control the amount of sunlight which can have direct access to plants on table 4. Above curtain 26 another wire screen 27 similar in all respects to screen 23 is positioned by being attached to the undersides of stays 28 which are fixed in position opposite to and a few inches above purlins 21, 22 and plate 24. These screens limit the upward vertical movement of the curtain 26 and thus protect it during wind storms. If desired, a second curtain may be used, as is shown in my copending application, Serial No. 775,200, by attaching its rollers to other hangers corresponding to hangers 25 and confining it between one screen and the other curtain.

It will be understood that the main roof 10 and the false roof, comprising one or more curtains 26, define a space through which a flow of air will take place during the warmer parts of the day. This flow of air will be induced by heat derived from the sun's rays which pass through curtain 26.

Additional cooling, as well as heating and any desired air conditioning, may be had by withdrawing air from the upper part of the plant-growing space and conducting it down through air duct 15 and through the air conditioning space 16 and thence into the plant-growing space beneath the plant-supporting table 4. Since this conditioned air surrounds the plants on table 4 directly after it enters the plant-growing space, it tends to keep them at the desired temperature at all times.

As was noted above, the upper or false roof comprising curtain 26 is considerably larger in plan view than the plant-growing space and while it is substantially flush with the north wall 2 of the greenhouse, it projects beyond each end wall and the south wall. The primary purpose of this projection or overhang of the roof is to afford some control over the sunlight which is admitted to the plants. While plants require sunlight for good growth, not all sunlight is beneficial to them. It appears that the sun's rays are quite beneficial to plant growth when they travel a considerable distance through the earth's atmosphere before striking the plants and when the rays travel a much shorter distance through the earth's atmosphere they may, indeed, be actually harmful to a plant's growth. Apparently, the earth's atmosphere absorbs some of the components of the sun's rays which are not beneficial to plant growth. The distance of travel of the sun's rays through the earth's atmosphere depends on the included angle which the sun's rays make with a line tangent to the earth at a given point. At Vero Beach, Florida, it has been found that the sun's rays are quite beneficial to plant growth when they make, with a line tangent to the earth's surface at that place, an included angle which is within a few degrees of 37°. When the sun's rays make an included angle higher than this maximum amount, as in the summer time at Vero Beach, the rays may even be harmful to plants. Accordingly, as will be seen by reference to Fig. 3, the upper or false roof is interposed between the sun's rays and all the plants in the greenhouse when the sun's rays make an angle of 75° with a line tangent to the earth's surface at the greenhouse and all the plants in the greenhouse are not exposed to the full sunlight until the sun's rays make less than about an angle of 37° with that tangent. When the angle of the sun's rays is between about 75° and about 37°, curtains may be pulled up along vertical south wall 5 and end walls 6 to protect the plants which would not be protected by the false roof. Thus, when the sun's rays make an angle of about 37°, the plants may be exposed to the full sunlight, but when the sun's rays make larger angles, some of the sunlight may be excluded from contact with the plants by using a curtain in the false roof with or without curtains on the side and end walls.

It will be understood that while certain angles have been stated above with respect to Vero Beach, Florida, different angles will obtain at other places and that when greenhouses are to be built at other places the approximate angle between sun's rays which are beneficial and those which are not beneficial to plant growth should be determined before the amount of roof overhang or the kind and position of curtains to be used are determined.

In addition to the control afforded by the roof overhang, I provide control over the amount of light which can be transmitted to the plants through curtain 26.

The curtain 26 may be composed of any suitable translucent material, such as a flexible plastic, or fiber glass. While such suitable materials will normally reduce to some extent the amount of sunlight reaching the plants therethrough, this amount can be considerably reduced by making parts of the upper surface of the curtain highly reflective. To that end the curtain is provided with light reflecting coatings for the top surface thereof preferably arranged in strips 30 extending north and south or up and down the slope, or from roller edge to roller edge as is shown in Fig. 1. Since the curtains will usually be longer in the east and west direction and shorter in the north and south direction, the light reflecting strips which run from north to south or up and down the slope may be said to extend crosswise of the curtain and such terminology will be used herein for the sake of brevity. Various materials may be used for this light reflecting coating but aluminum paint is one coating which is not only effective to reflect sunlight but may be applied quickly and cheaply, for example by spraying. Metal foil may also be used as the reflecting material.

I contemplate changing curtains from time to time with the seasons and accordingly provide curtains having different ratios of light reflecting and light transmitting areas. For example, for midwinter use the curtain may have strips of light reflecting material 30 about one inch wide extending up and down the slope and arranged alternately with uncoated light transmitting strips 31 three or four inches wides. Such a curtain will reflect about 25% of the sunlight striking it while the remainder, minus what is absorbed by the translucent curtain and main roof, will pass through to roof 10 and most of that light will reach the plants. A curtain for use in midsummer may have a different condition of light reflecting and light transmitting parts, for example, light reflecting strips three or four inches wide and one inch translucent portions of the curtain therebetween. For use in other seasons the strips may be of substantially equal width or of any other ratios of reflecting and transmitting strips. Curtains may also be used which will transmit different amounts of light but I prefer the curtains with the alternate strips for reasons about to be stated. By using such curtains at different times it is possible to expose the plants at all times to amounts of sunlight which are controlled in accordance with the plant needs. For midsummer, and possibly at other seasons, the entire upper surface of the curtains may be covered with reflective coating.

One important advantage in the use of a curtain having alternate light reflecting and light transmitting strips is that by varying the widths of these strips the amounts of sunlight directly applied to the plants may be regulated in accordance with the intensity of the sunlight. In other words, with the strips running north and south on the greenhouse, and the greenhouse extending east and west, the sunlight passing through the light transmitting strips will move over all the plants in the greenhouse from west to east and each plant will receive direct sunlight for a period of time and then will be shaded or protected from direct sunlight by a light reflecting strip for another period of time and this cycle will be repeated many times during the day depending on the width and number of the strips. When the light transmitting strips are about an inch wide a time of a few minutes may be sufficient for its shadow to pass over a plant of given size while a period of three or four times as long will elapse during which a light reflecting strip three or four inches wide will be interposed between the sun and the plant. Furthermore, since the light reflecting strips of the curtain prevent passage of sun's rays through the curtain and into the space between the main roof and false roof and on through the main roof of the greenhouse, the extent of heating of air in both places is correspondingly reduced and the task of maintaining a desirably low temperature within the greenhouse is simplified.

It will be understood that each curtain preferably includes its own rollers which can be mounted in hangers 25. Such curtains may be changed simply by disengaging the rollers of one curtain from the hangers and mounting the rollers of another curtain in the hangers. Alternatively, one set of rollers may be used with any one of several curtains by attaching the ends of any curtain to the rollers. In one or the other of these manners any curtain may be replaced readily and easily by another curtain to meet a different condition or to give a different result.

Subject matter shown but not claimed herein is claimed in one or another of my copending applications, Serial No. 775,200, filed September 20, 1947, and Serial Nos. 261,968, 261,969 and 261,970, all filed on December 17, 1951.

Having thus described the present invention so that others skilled in the art may be able to understand and practice the same, I state that what I desire to secure by Letters Patent is defined in what is claimed.

What is claimed is:

1. A greenhouse comprising a floor, end walls, side walls, and an upwardly inclined translucent main roof defining a closed plant-growing space, and a false roof substantially parallel with and spaced above the main roof defining therewith a passage for the flow of air therebetween and comprising a flexible translucent protractile curtain and means above and below the curtain for limiting the vertical movement thereof.

2. A greenhouse extending east and west and comprising a floor, end walls, a north side wall, a south side wall of less height than said north wall, and an upwardly inclined translucent main roof extending from the top of the south wall to the top of the north wall, said floor and walls defining a closed plant-growing space, a false roof spaced above the main roof defining therewith a passage for the flow of air therebetween and extending from above the north wall to beyond the south wall, and beyond each end wall, said false roof comprising a flexible, translucent protractile curtain and means above and below the curtain for limiting the vertical movement thereof.

3. A greenhouse extending east and west and comprising a floor, translucent end and north and south side walls, and an inclined translucent main roof extending upwardly from the top of the south wall to the top of the north wall, said floor, walls and roof defining a closed plant-growing space, a false roof substantially parallel with and spaced above the main roof defining therewith a passage for the flow of air therebetween and extending from above said north wall far enough beyond each end wall and the south wall to intercept the sun's rays during the middle of the day, said false roof comprising a flexible, translucent, protractile curtain and wire mesh means above and below the curtain for limiting the vertical movement thereof.

4. An air conditioned greenhouse comprising a translucent main roof sloping upwardly from the south side toward the north side of the greenhouse, a vertical wall, and a protractile roof disposed above the main roof and defining therewith a passage for the flow of air therebetween, said protractile roof consisting of flexible material having light transmitting strips extending crosswise thereof and strips of light reflective material on its top surface alternating with said light transmitting strips.

5. An air conditioned greenhouse comprising a translucent main roof sloping upwardly from the south side toward the north side of the greenhouse, a vertical wall, and a protractile roof disposed above and substantially parallel to the main roof and defining therewith a passage for the flow of air therebetween, said protractile roof consisting of flexible, light transmitting material having spaced strips of light reflective material extending crosswise thereof on its top surface, and screen wire above and below said protractile roof to maintain it in its predetermined position relative to the main roof.

6. A greenhouse comprising north and south side walls extending east and west, a translucent main roof, a skeleton roof structure sloping downwardly from above the north wall, hangers for protractile curtains attached to the skeleton structure near its north and south edges, and a translucent, flexible, protractile curtain replaceably attached to said hangers and disposed above and substantially parallel to said main roof and defining therewith a passage for the flow of air therebetween.

7. Means for delivering to plants in a greenhouse the desired amount of sunlight at all times comprising a protractile, flexible roof to cover the plants when sunlight is too bright and to expose the plants at all times when the sunlight is beneficent, said roof being interchangeable with one or more similar roofs of such characteristics as will transmit more or less light than the first mentioned roof as may be suitable to different seasons of the year, said flexible roof being spaced above the main roof of the greenhouse and defining therewith a passage for the flow of air between said roofs.

8. A greenhouse having a flexible, protractile roof of predetermined light transmitting characteristics, said roof being quickly and easily interchangeable with other similar roofs of different light transmitting characteristics, said flexible roof being spaced above the main roof of the greenhouse and defining therewith a passage for the flow of air between said roofs.

9. A greenhouse comprising a translucent main roof sloping upwardly from the south side of the greenhouse, a protractile roof disposed above and substantially parallel to the main roof and defining therewith a passage for the flow of air between said roofs, said protractile roof comprising translucent, flexible material having spaced strips of light reflective material on the upper surface and extending crosswise thereof.

10. A greenhouse having a translucent main roof and a protractile roof disposed above and substantially parallel to the main roof, said protractile roof consisting of flexible, translucent material and spaced strips of light reflective material on the top surface and extending crosswise thereof.

ARTHUR G. McKEE.

References Cited in the file of this patent

UNITED STATES PATENTS

| Number | Name | Date |
|---|---|---|
| 215,374 | Lefebure | May 13, 1879 |
| 1,648,257 | Burke | Nov. 8, 1927 |
| 1,703,388 | Burrage | Feb. 26, 1929 |
| 1,789,513 | Burrage | Jan. 20, 1931 |
| 2,031,157 | Gilson | Feb. 18, 1936 |
| 2,046,601 | Atkinson | July 7, 1936 |
| 2,069,292 | Walker | Feb. 2, 1937 |
| 2,193,921 | Gibbons | Mar. 19, 1940 |

FOREIGN PATENTS

| Number | Country | Date |
|---|---|---|
| 371,926 | France | Feb. 6, 1907 |
| 386,280 | Great Britain | Jan. 12, 1933 |
| 48,930 | Switzerland | Sept. 24, 1909 |
| 59,072 | Switzerland | Feb. 24, 1912 |